Patented Jan. 27, 1925.

1,524,030

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

FUSED ORE OF CHROMIUM OXIDE AND METHOD OF MAKING THE SAME.

No Drawing. Application filed April 25, 1922. Serial No. 556,426.

*To all whom it may concern:*

Be it known that I, MINER L. HARTMANN, a citizen of the United States, residing at Niagara Falls, in the county of Niagara and State of New York, have invented a new and useful Improvement in Fused Ores of Chromium Oxides and Methods of Making the Same, of which the following is a full, clear, and exact description.

My invention relates to methods of treating ores of chromium and a new material having new and useful properties which make it useful as a refractory, an abrasive, or for other useful purposes. I will illustrate my method by describing its application in the fusion of chromite, which is the principal ore of chromium oxide found in nature and the principal source of chromium compounds.

Chromite consists theoretically of a combination of oxides of iron and chromium of the chemical formula $FeCr_2O_4$, with varying proportions of minor impurities such as silica, alumina, etc. In carrying out the process, any ordinary form of arc furnace with vertical electrodes depending into the furnace pot or chamber will be found suitable and is the preferred form of heating means. The electrodes may be of carbon or of graphite. I prefer to use graphite on account of the lessened amount of reduction which takes place from the carbon of the electrode. The furnace pot may be lined with refractory material, such as chrome brick. The ore is dried and crushed to a size of ¾ of an inch and finer. The charge of ore is fed into the furnace around the electrodes, and a mass of fused chromite forms under the action of the arc. As this finished product accumulates and builds up under the arc and also spreads out in a fused condition for some distance outside of the arc, the electrodes are raised to allow the finished product to form a large pool which solidifies into a pig or ingot of considerable size. After a sufficient amount of the charge has been smelted to form an ingot of a size convenient to handle, the furnace run is stopped and the fused mass is allowed to cool.

In carrying out this operation it is desirable that but little reduction take place, and to this end the electrodes are kept as much as possible out of contact with the ore. Some reduction may take place, forming globules of metallic ferrochromium through the fused chromite, and this may be subsequently removed when the material is crushed and concentrated. I have described the process as an intermittent one, but the furnace may be run continuously on the tapping principle and other methods of heating besides arc heating may be used.

The fused chromite is a dark brown-black vitreous appearing material having a bright shining fracture. It has a specific gravity of about 4 and a hardness of between 6 and 7, on Mohr's scale of hardness. Most parts of the pig are dense, although some are porous, evidently due to the evolution of some gases. Its melting point varies from 1800° C. to 2000° C., depending on its purity.

In applying it as a refractory, I crush it to a size of about ⅛ of an inch and finer, add suitable binder, as, for example, clay or magnesia, and mold it after the manner well known in the manufacture of refractories. I may use also as a binder finely divided chromite or other chromium compounds. After molding and drying, the article is brought to such temperature as will properly bond it together. When using chromite or finely divided chromium material, I may make a satisfactory article by bringing it to a temperature where the chromite sinters.

The fused chromite or chromium ore may also be advantageously used in refractory cement mixtures for the setting of chrome refractory shapes or for the molding of monolithic linings or parts in furnaces. For such purposes, I mix the crushed fused chromite or chromium ore as produced above, with suitable binders, as, for example, finely divided chromite or other chromium compounds, clay or magnesia; temper the mixture with water; and ram or tamp into place by well known methods. I may also apply this raw fused chromite cement mixture as a protective paint or wash to the surface of other refractories.

I claim:

1. The process of producing a refractory article, comprising fusing chromium oxide ore and shaping the article from the fused ore.

2. The process of treating ores of chromium oxide, which consists in fusing the ore without substantial reduction.

3. The process of treating ores of chromium oxide, which consists in applying heat to a mass of said ore in a substantially non-reducing environment, and fusing the ore.

4. The process of treating ores of chromium oxide, which consists in applying electrically developed heat to a mass of said ore in a substantially non-reducing environment, and fusing the ore without substantial reduction.

5. The process of treating chromite, which consists in applying electrically developed heat to a mass of said ore in a substantially non-reducing environment, and fusing the ore without substantial reduction.

6. The process of treating chromite, which consists in subjecting to the heat of the electric arc a mass of chromite in a substantially non-reducing environment, fusing said chromite without substantial reduction, and allowing the mass to cool.

7. A new article of manufacture, formed of crushed fused ore of chromium oxide and a binder.

8. A shaped and fired refractory article containing crushed fused ore of chromium oxide and a binder.

9. A new article of manufacture, formed of crushed fused chromite and a binder of clay in a compact mass.

10. As a new article of manufacture, a shaped refractory article composed principally of fused ore of chromium oxide.

11. As a new article of manufacture, a shaped refractory article composed principally of fused chromite.

12. As a new article of manufacture, a raw or unburned cement mixture composed principally of fused chromite.

In testimony whereof I have hereunto set my hand.

MINER L. HARTMANN.